United States Patent [19]

Stillwagon et al.

[11] Patent Number: 5,050,413
[45] Date of Patent: Sep. 24, 1991

[54] DOOR LATCH WITH LOCK AND RELEASE FOR VENDING MACHINES AND THE LIKE

[75] Inventors: Woodrow C. Stillwagon, Fulton County, Ga.; Donald Embry, Breckinridge County, Ky.

[73] Assignee: Star Lock Systems, Inc., Columbus, Ohio

[21] Appl. No.: 557,305

[22] Filed: Jul. 23, 1990

Related U.S. Application Data

[63] Continuation of Ser. No. 358,888, May 30, 1989, which is a continuation-in-part of Ser. No. 327,250, Mar. 22, 1989, Pat. No. 4,900,182.

[51] Int. Cl.$^5$ ............................................. E05B 25/00
[52] U.S. Cl. ......................................... 70/386; 70/491
[58] Field of Search .......................... 70/490, 491, 306

[56] References Cited

U.S. PATENT DOCUMENTS

| | | | |
|---|---|---|---|
| 1,234,212 | 7/1917 | Renaux | 70/38 C |
| 1,499,444 | 7/1924 | Caillois | 70/38 C |
| 3,525,242 | 8/1970 | Young | 70/38 C |
| 4,893,810 | 1/1990 | Lee | 272/123 |
| 4,946,130 | 8/1990 | Kooiman | 70/38 C |

FOREIGN PATENT DOCUMENTS 2633669 2/1977 Fed. Rep. of Germany ........ 70/386

Primary Examiner—Robert L. Wolfe
Attorney, Agent, or Firm—Louis T. Isaf

[57] ABSTRACT

A door latch comprises a post and collar gripping and release mechanism cooperatively mounted to the door and door frame of a vending machine, cabinet, or the like, to provide an initial latching function in the form of a frictional gripping of the post by the collar, and further comprises a lock assembly associated with the post and collar mechanism to provide a primary locking function and to effect release of the latching function.

18 Claims, 5 Drawing Sheets

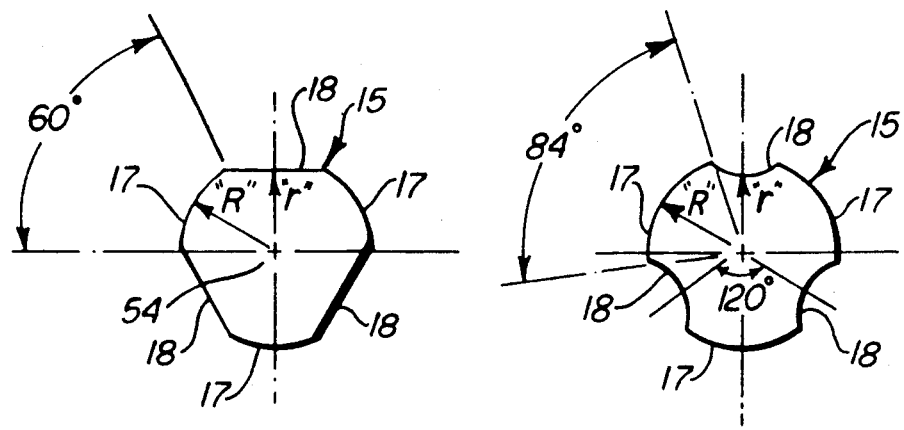
FIG 7  FIG 8
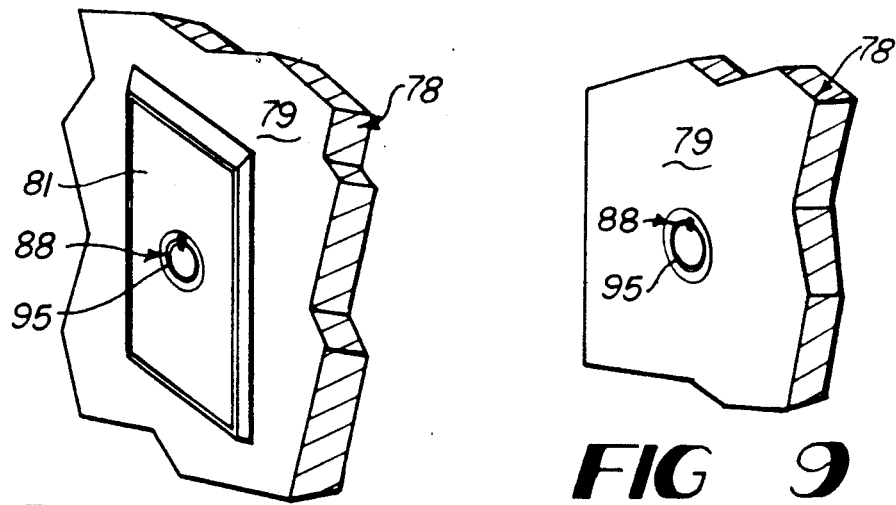
FIG 9
FIG 10
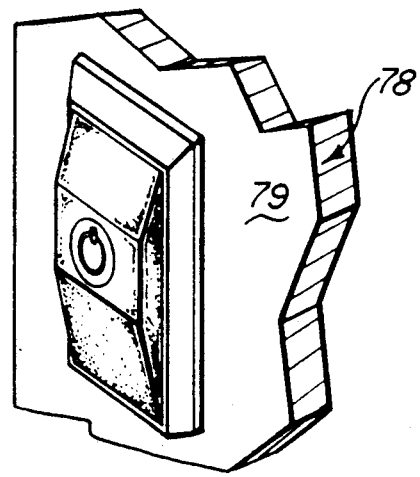
FIG 11
(PRIOR ART)

DOOR LATCH WITH LOCK AND RELEASE FOR VENDING MACHINES AND THE LIKE

This application is a continuation of application Ser. No. 07/358,388, filed May 30, 1989, which is a continuation-in-part of application Ser. No. 07/327,250, filed Mar. 22, 1989, now U.S. Pat. No. 4,900,182.

FIELD OF THE INVENTION

This invention relates generally to the field of latching and locking devices and, also, to the general field of vending machines, and more specifically to the field of key operated door latching devices for vending machines and the like.

BACKGROUND OF THE INVENTION

Hordes of vandals have taken a large toll on the vending machine industry, pilfering millions of dollars yearly from destroyed or illegally accessed money boxes. Vending machines are found in just about every facet of our lives, performing such tasks as vending food, drinks, candy, magazines, toys, stamps and even vending money (i.e. money changing machines). The vending machine, without human intervention, accepts money from a customer and, in exchange for the money, dispenses an item to the customer. The accepted money is held within a money box inside the machine and awaits collection by, preferably, an authorized "route man". Typically, the money box is housed within a cabinet which is accessed through a door which is opened by a key.

Vandals use numerous methods, with varying degrees of brutality, to open the door and access the money. To name a few: they drill through the key cylinder to disarm the lock; they grip protruding segments of the door latch with a pipe wrench and snap off the latch stem with a torquing action; they pry open the doors with a crow bar. Needless to say, the industry is desperately seeking new latching and locking devices which will thwart the efforts of the vandals.

SUMMARY OF THE INVENTION

Briefly described, the door latch of the present invention comprises a bar and collar gripping and release mechanism cooperatively mounted to the door and door frame of a vending machine or money box cabinet to provide the initial latching function in the form of a frictional gripping of the bar by the collar, and also comprises a lock assembly associated with the bar and collar mechanism to provide a primary locking function and to effect release of the latching function.

The components and functions of the bar and collar mechanism are understood by reference to the specification of the parent and co-pending application, U.S. application Ser. No. 07/327,250, filed Mar. 22, 1989 (also referred to herein as the "parent specification"), which specification is made a part hereof and incorporated herein by this reference. A copy of the referenced parent specification is attached hereto and made a part hereof. The lock assembly is of a type typically known in the art, comprising, in the preferred embodiments, a casing, a core and a locking linkage between said casing and said core, whereby, when the linkage is unlocked, as by a key or combination, the core is rotatable about an axis within said casing and, when the linkage is locked, the core and casing are prevented from relative movement. The lock assembly is connected by interface linkage to the bar and collar mechanism so as to effect release of the latching function of the bar and collar mechanism when the core experiences relative movement within the casing.

The bar of the bar and collar mechanism is rigidly attached to one of the door elements (either the door or the door frame) and the collar portion is rigidly attached to the other of the door elements. Alignment of the bar and collar is such that, as the door is closed, the bar engages and protrudes into the axial passage of the collar's inner shell. To effect the latching function of the present invention (the ball-on-arc latching function) the arcuate surface of the bar is, upon protrusion of the bar into the collar passage, aligned with the balls of the collar. The interface linkage between the lock assembly and the bar and collar mechanism functions such that the latching function of the bar and collar can not be released except through operation of the key or combination of the lock assembly. In the preferred embodiments, the lock assembly is a key operated lock assembly and operation of the key effects movement of the core which, through interaction of the interface linkage, releases the latching function of the bar and collar by one or both of the "axial-pull" release method or the "angular-twist" release method. Upon release of the latching function, the door of the vending machine (or money box cabinet) can be opened, since the bar will pull free of the collar.

For a better understanding of this frictional-grip, latching function (the ball-on-arc gripping function) and related releasing methods, please refer to the referenced parent specification of U.S. Ser. No. 07/327,250.

An alternate embodiment of the present invention, introduces an angular-twist release method which effects release of the latching function by alignment of the balls of the collar with grooves formed in the tension ring of the collar. Still another alternate embodiment introduces a cinching assembly which features a spring loaded post for drawing the door tightly to the door frame.

It is, therefore, an object of the present invention to provide a door latch which greatly hinders the efforts of vandals to break through the locked door latch.

Another object of the present invention is to provide a door latch which effects a gripping action between latch components, whereby the gripping force increases as the door is pulled or pried without proper operation of the key or combination.

Still another object of the present invention is to provide a vending apparatus, cabinet or the like which comprises a unique door latch to assist in deterring vandals.

Yet another object of the present invention is to provide a vending apparatus with a combination of latching and cinching mechanisms which latch the door to the door frame and "automatically" draws the door into close proximity to the door frame.

Other objects, features and advantages of the present invention will become apparent upon reading and understanding the present specification, with the referenced parent specification, when taken in conjunction with the appended drawings.

BRIEF DESCRIPTION OF THE DRAWINGS

FIG. 7 is a view of the post of FIG. 2, as if taken along line 7—7 of FIG. 2, and depicting one embodiment thereof.

FIG. 8 is a view of the post of FIG. 2, as if taken along line 8—8 of FIG. 2, and depicting an alternate embodiment to that of FIG. 7.

FIG. 9 is an isolated, frontal, pictorial view of the Door Latch, and related door components, of FIG. 1.

FIG. 10 is an isolated, frontal, pictorial view of the Door Latch, and related door components, of FIG. 1, and depicting an alternate embodiment to that of FIG. 9.

FIG. 11 is an isolated, frontal, pictorial view of a prior art door latch, and related door components.

DETAILED DESCRIPTION OF THE DRAWINGS

Figure 1:
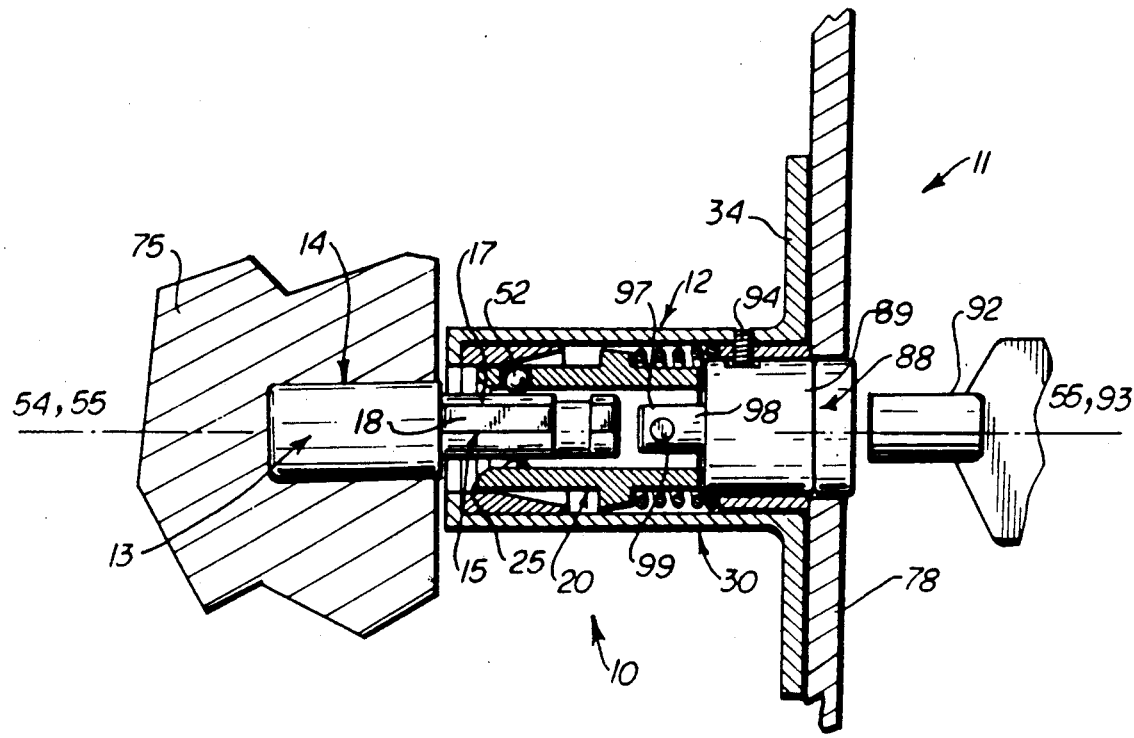
FIG. 1 is an isolated side view, with portions cut away of a Door Latch, and related door components, in accordance with the present invention, and depicting one embodiment thereof.

Referring now in greater detail to the drawings, in which like numerals represent like components throughout the several views, the drawings depict numerous embodiments of a door latch 11 in accordance with the present invention. The door latch 11, in its basic components, is seen in each embodiment as including: a first body 75 representing, for example, the door frame 75 of a vending machine, cabinet or the like; a second body 78 representing, for example, the door 78 of the vending machine, cabinet or the like; a post 14 corresponding, generally, to the bar portion 14 of the bar and collar gripping and release mechanism 10 (also referred to as the lock and release apparatus 10) of the parent specification; a collar portion 12 corresponding, generally, to the collar portion 12 of the bar and collar gripping and release mechanism of the parent specification; a lock assembly 88; and an interface linkage 94.

For a greater, detailed description of component parts and function of the post 14 and the collar portion 12, the reader is directed to study the parent specification which has been made a part hereof by reference. An understanding of the parent specification will provide a basic understanding of the gripping and release apparatus (the post 14 and collar 12 combination) utilized in the present invention and will prevent the need to restate that entire specification in this document; and any necessary description of modifications in structure or operation, not apparent by reference to the parent specification, will be detailed herein.

Whereas, with reference to the intended function of the lock assembly 88, it will be noted that various types of key operated and combination operated lock assemblies known in the art are usable as the lock assembly 88 within the scope of the present invention, the preferred embodiments depict a key operated lock assembly 88 which is one type typically known in the art. The preferred, key operated lock assembly 88 comprises a casing 89, a core 90 and a locking linkage 91 between said casing and said core, whereby, when the linkage is unlocked, as by a key 92, the core is rotatable about an axis within said casing and, when the linkage is locked, the core and casing are prevented from relative movement. The locking linkage 91 typically comprises a plurality of tumblers which block relative movement of the casing 89 and core 90 and which are aligned by the proper key to allow such relative movement. Examples of acceptable lock assemblies are those disclosed in U.S. Pat. Nos. 4,683,739 and 4,716,749; and additional detailed explanation of such lock assemblies is deemed unnecessary in this disclosure.

The interface linkage 94, of the preferred embodiments, connects the rotatable core 90 of the lock assembly 88 to either the post 14 or the collar 12, depending on the embodiment. The function of the interface linkage 94 is to effect operation of one or both of the axial-pull or angular-twist release function of the post and collar gripping and release mechanism 10, in response to the operation of the key assembly 88.

EMBODIMENT OF FIG. 1

A first, preferred embodiment of the door latch 11 of the present invention is seen in FIG. 1. In this embodiment, the collar portion 12 is rigidly attached, as by welding, bolts or other appropriate method, to the door 78 of the vending machine, and the post 14 is rigidly attached, as by welding, bolting or other appropriate method, to the door frame 75. The embodiment of FIG. 1 is uniquely constructed to utilize the key operated lock assembly 88 to activate the angular-twist release function of the post and collar mechanism 10.

Figure 3:
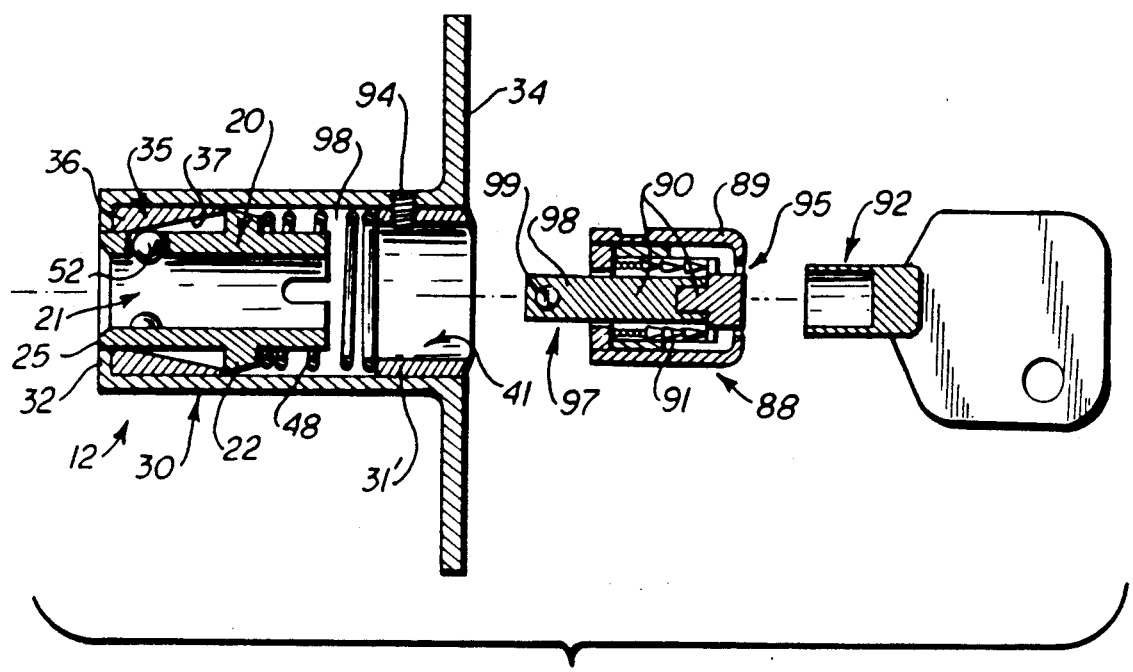
FIG. 3 is an isolated side view, with portions cut away, of the collar portion and lock assembly of the Door Latch of FIG. 1.
Figures 4, 5:
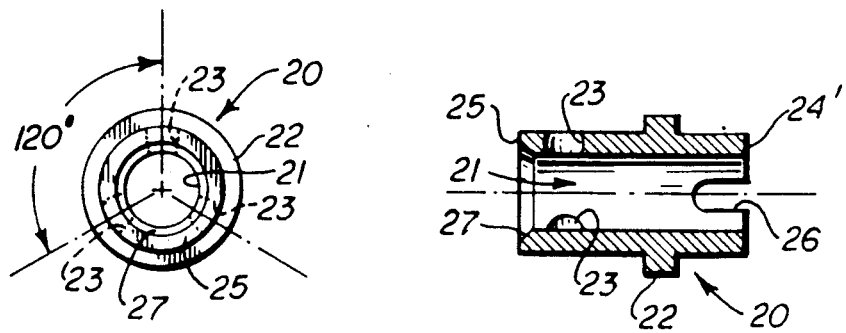
FIG. 4 is an isolated, cut away, side view of the inner shell of the collar assembly of the Door Latch of FIG. 1.
FIG. 5 is a back-end view of the inner shell of FIG. 4.
Figure 6:
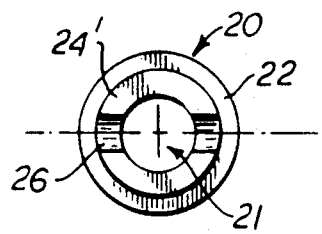
FIG. 6 is a front-end view of the inner shell of FIG. 4.

With reference to FIGS. 1 and 3, the collar portion 12 is seen as including the cylindrical inner shell 20, the outer sleeve 30, the tension ring 35 with tapered cam segment 37, biasing spring 48, and movable balls 52 within radial openings 23 of the inner shell. The front end 34 of the outer sleeve 30 has been formed into a wide mounting plate 34 by which the outer sleeve and, thus, the collar portion 12 is mounted to the vending machine door 78. A separate spacer ring 31' is press fitted into the sleeve 30 replacing the flange 31 seen in the parent specification; although, the fixed flange 31 of the parent specification is acceptable in less preferred embodiments. Whereas, the tension ring 35 is shown with the tapered cam segment 37, absent the undercut 39 of FIG. 3 of the parent specification, such an undercut cam segment is an acceptable alternate. With reference to FIGS. 4 and 6, the inner shell 20 is seen as including a thin slot 26 defined in its front end 24'. The back end 25 is formed with a chamfer 27. In the disclosed embodiment of FIG. 5, there are three radial openings 23 (and corresponding, movable balls 52) located equally spaced at 120° apart. Other numbers of openings 23 and different angular orientation are within the scope of the present invention.

Figure 2:
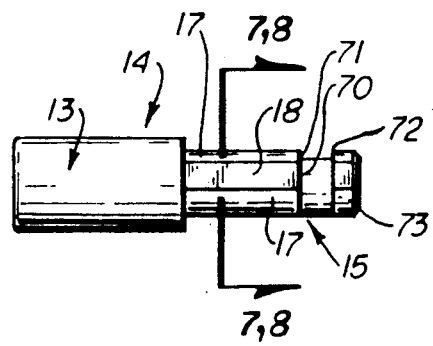
FIG. 2 is an isolated side view of the post of the Door Latch of FIG. 1.

The post 14 is seen in FIGS. 1 and 2 as comprising, generally, two portions: the mounting portion 13 by which the post is rigidly attached to the door frame 75; and the latch portion 15 by which the post is "gripped" by the collar 12 to effect the primary latching function. The latch portion 15 of this embodiment is seen as being "multi-surfaced". The term "multi-surfaced" is used to indicate that the surface of the latch portion 15 of the post 14 alternates, about the circumference of the post, from a first surface 17, defined at an outer radius ("R") from the post axis 54, to a second surface 18, defined at an inner radius ("r") from the post axis 54. With reference to FIGS. 7 and 8, two alternate configurations of the multi-surfaced latch portion 15 of the post are studied. FIG. 7 depicts an end view (as if taken along line 7—7 of FIG. 2) of the multi-surfaced latch portion 15 of the embodiment disclosed in the parent application, and acceptable as one embodiment of the present invention, wherein the alternating surfaces are arcuate surfaces 17 and flat surfaces 18. The latch portion 15 of FIG. 8 depicts an end view (as if taken along line 8—8 of FIG. 2) of an alternate embodiment of post 14, wherein the alternating surfaces are convex (arcuate) surfaces 17 and concave surfaces 18, defining, for example, a series of elongated ridges 17 and troughs 18. In each of the embodiments of FIGS. 7 and 8, and in other possible embodiments, the first surface 17 defines an outer radius "R" of sufficient distance to force frictional engagement of the balls 52 against the tension ring 35 during the ball-on-arc gripping function; and the second surface 18 defines a lessened radius so as to avoid frictional engagement between the balls 52 (when aligned with the point of inner radius "r") and the tension ring 35. As noted by the example dimensions of FIGS. 7 and 8, by making the inner surface 18 a concave surface (FIG. 8) rather than a flat surface (FIG. 7), the effective gripping surface of the arcuate surface 18 is increased, while maintaining the same, effective, inner radius "r" and the same outer radius "R".

In the disclosed embodiment of FIGS. 1 and 2, the multi-surfaced configuration of the latch portion 15 is interrupted by a cylindrical "dead zone" 70 which, in effect, creates a break in the elongated ridges of each of the arcuate surfaces. It will be noted that the back edge 71 of the "dead zone" 70 is (optionally) tapered and the front edge 72 is, preferably, at a right angle to the front piece 73 of the outer (arcuate) surfaces 17. These features cooperate to create an optional, yet preferred, safety feature discussed in operation below.

The lock assembly 88 is mounted in the front end of the collar portion 12 within the cavity 41 formed by the spacer ring 31. The lock assembly 88 is held in the cavity 41 by one or more set screws or pins 94; and the set screws 94 maintain the casing 89 (but not the core 90) of the key assembly stationary relative to the outer sleeve 30 of the collar 12. The key accepting end 95 is seen in the drawings as protruding forward, beyond the collar 12. The amount of protrusion will depend, in alternate embodiments, on the particular application and assists in the anti-vandal performance of the overall invention. For example, in the disclosed embodiment of FIG. 1, the key assembly 88 protrudes only to the outermost face 79 of the door 78 so the key assembly can not be grasped by a vise-grip or other wrenching tool. See also FIG. 9 which shows a view of the embodiment of FIG. 1 from the face 79 of the door 78. Note the distinction between the present invention as embodied in FIG. 9 verses at least one prior art device of FIG. 11. An alternate embodiment of the present invention is seen in FIG. 10, showing a possible "retrofit" embodiment where the post and collar mechanism 10 must be bolted to the door 78 and an outer plate 81 is required. In this embodiment of FIG. 10, the outer plate 81 is designed for minimal protrusion and there are seen to be no straight edges to be grasped by a wrenching tool. In still other alternate embodiments, the key assembly casing 89 is shortened or the collar sleeve 30 is lengthened so that the key accepting end 94 of the key assembly is flush with the front edge 34 of the sleeve 30.

In the embodiment of FIG. 1, the interface linkage 97 comprises an axially extending shaft 98 mounted to the rotatable core 90 of the lock assembly 88, for rotation with the core, and a pin 99 mounted to the end of the end of the shaft 98 and perpendicular to the shaft, which pin interfaces with the thin slot 26 in the front end 24 of the collar, inner shell 20. Thus, it will be understood that as the core 90 of the lock assembly 88 is turned within the casing 89 (which casing is held stationary within the sleeve 30 by the set screws 94), the shaft 98 and pin 99 of the interface linkage 97 effect a turning of the inner shell 20 within the sleeve 30.

Thus, the operation of the present invention with reference to the embodiment of FIG. 1, is as follows. The post 14 is mounted to the door frame 75. The collar portion 12 is mounted to the door 78. The post 14 and collar 12 are so aligned, when the door 78 is closed, the post engages and protrudes into the axial passage 21 of the collar's inner shell 20. The lock assembly 88 is inserted into the cavity 41 with the pin 99 of the interface linkage aligned within the slot 26 of the collar, inner shell 20. Before setting the lock assembly casing 89 tightly in place, and before closing the door 78 for the first time, the core 90 is assured to be in the locked position relative to the casing, and then the entire lock assembly 88 is rotated about its axis 93, thus rotating the collar, inner shell 20 about its axis 55. This rotation of the lock assembly is done to align the balls 52 of the collar, inner shell 20 with the outer (arcuate) surfaces 17 of the post 14. Once the alignment is accomplished, the lock assembly casing 89 is set tightly in place relative to the collar sleeve 20 by tightening the set screws 94. Now, with the lock assembly 88 placed in the locked position, as by the key, when the door 78 is closed, the arcuate surfaces 17 of the post 14 are, upon protrusion of the post into the collar passage 21, engaged by the balls 52 to effect the ball-on-arc gripping function of the post and collar combination. This is the primary latching function. (It will be noted that the slot 26 of the inner shell 20 is of sufficient depth to allow the shell to move relative to the pin 99 of the interface linkage 97 when the post 14 is inserted into the collar 12.) The door 78 is now latched to the frame 75 and can only be opened by inserting the key into the lock assembly 88 and turning the core 90 within the casing 89 by using the key. When the key is turned, the interface linkage post 98 and pin 99 turn the inner shell 20 to move the balls 52 to the inner surfaces 18 of the post 14, thus effecting the angular-twist latch release function. The door can now be opened as the post will move freely out of the collar with the balls on the surfaces of reduced radius "r". Before the door is again closed, the core 90 is returned to the locked position by the key, where the balls will again be aligned with the arcuate surfaces 17 of the post 14.

With the door 78 closed and the door latch 11 in the ball-on-arc latched position, the door latch resists prying open since the frictional grip becomes tighter as one tries to pull the post 14 from the inner shell 20. In the event that a vandal uses such extreme force on the door 78 that the collar 12 is indeed forced to slide off the post, the collar will slide only so far off the post until the balls 52 reach the dead zone 70 on the post. At the point of the dead zone: the balls 52 drop into the lower radius surface of the dead zone, thus clearing the cam surface; the spring 48 pushes the inner shell 20 toward the back end 32 of the sleeve 30 so the balls 52 are now blocked by the mounting segment 36 of the tension ring 35 from outward radial movement; the perpendicular front edge 72 of the dead zone combines with the outwardly immovable balls 52 to create a positive brake against further opening of the door. To now open the door, the key must be inserted to turn the lock core 90 and inner shell 20 to align the balls 52 with the second surfaces 18 of reduced radius "r" in the front piece 73 of the post.

Figure 12:
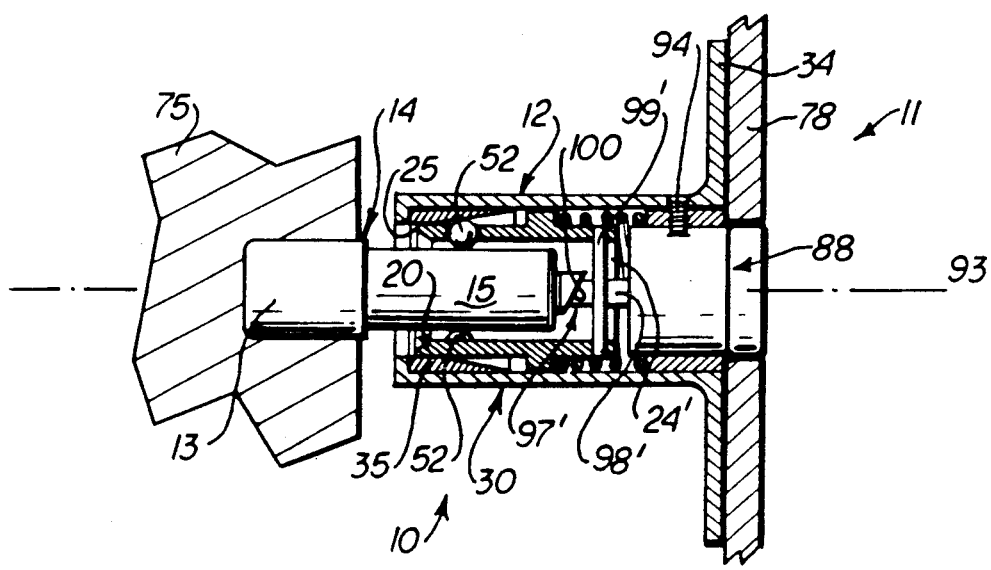
FIG. 12 is an isolated side view, with portions cut away, of a Door Latch, and related door components, in accordance with the present invention, and depicting an alternated embodiment to that of FIG. 1.

Embodiment of FIG. 12

An alternate embodiment of the door latch 11 of the present invention is seen in FIG. 12. The embodiment of FIG. 12 is uniquely constructed to utilize the lock assembly 88 to activate the axial-pull release function of the post and collar mechanism 10. The major distinguishing features between the embodiment of FIG. 12 and that of FIG. 1 lie in the interface linkage 97 and its interconnection with the collars, inner shell 20. With reference to FIG. 12, the interface linkage 97' includes a shaft 98' which is defined with an inclined or cam surface 100, much like a thread. A pin 99', oriented perpendicular to the shaft 98', rides on the cam surface 100 and is fixed to the front end 24' of the collar's inner shell 20. Preferably for this embodiment, the latching portion 15 of the post 14 defines a completely cylindrical surface at the outer radius "R" which will effect the frictional gripping (latching) function of the post and collar combination, when the door 78 is closed. To unlatch the door 78, the core 90 of the lock assembly 88 must be turned about its axis 93, as by the key, thus turning the shaft 98', causing the pin 99' to move along the cam surface 100 toward the front end 34 of the collar sleeve 30. The moving pin 99' draws with it the inner shell 20, to which it is fixed. Thus, it is seen that the turning of the lock assembly core 90, as during unlocking by a key, activates the axial-pull release function of the of the post and collar combination; and the collar 12 will slide off the post 14, allowing the door 78 to be opened. The door latch 11 of FIG. 12 is depicted in the unlock position, with the pin 99 and inner shell 20 drawn to their forward most position where the grip on the post 14 is released.

Figure 13:
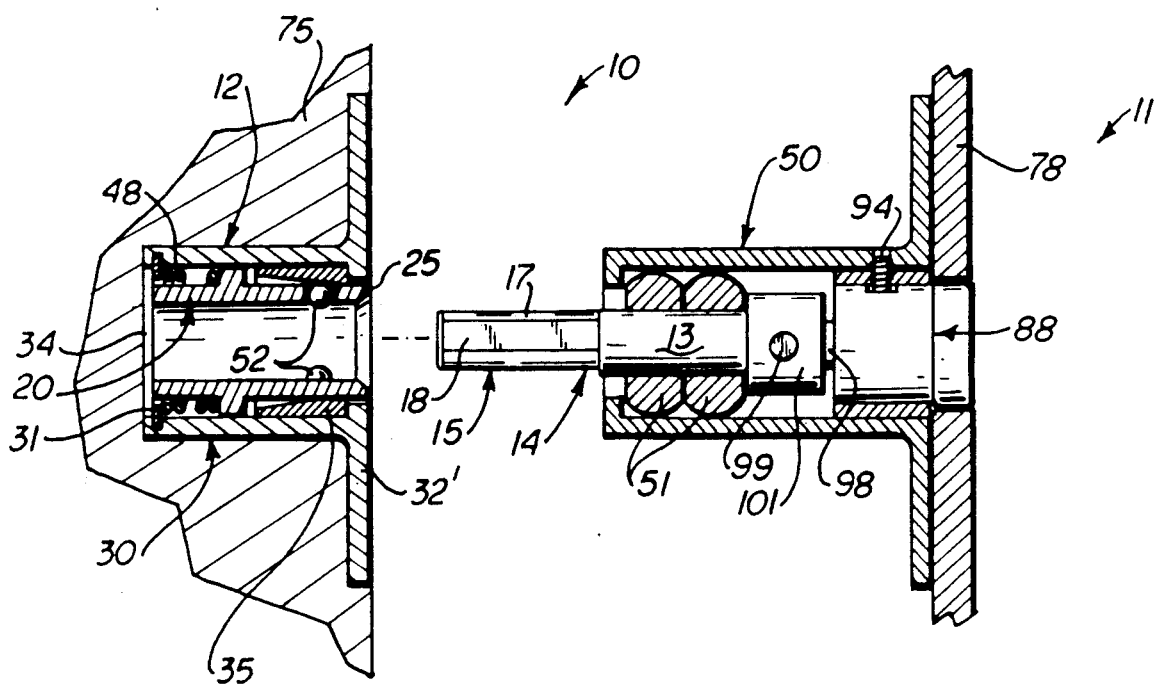
FIG. 13 is an isolated side view, with portions cut away, of a Door Latch, and related door components, in accordance with the present invention, and depicting a second alternate embodiment to that of FIG. 1.

Embodiment of FIG. 13

Yet another alternate embodiment of the door latch 11 of the present invention is seen in FIG. 13. The embodiment of FIG. 13 is uniquely constructed to utilize the lock assembly 88 to activate the angular-twist release function of the post and collar mechanism 10 by angular rotation of the post 14, rather than the collar components. In this embodiment, the collar portion 12 is mounted to the door frame 75 and the post 14 is mounted to the door 78. With reference to FIG. 13, the outer sleeve 30 of the collar portion 12 is seen with its back end 32' formed into a mounting plate 32' by which the sleeve, and thus the collar, is mounted to the door frame 75. This is by way of example only, and side mounting or mounting from the front end 34, as well as other appropriate mounting is acceptable. The outer sleeve 30 is provided with the flange 31 at its front end 34, as in that of the parent specification. It is seen that the collar portion 12 is oriented such that the back end 25 of the inner shell 20 is facing the door 78 so as to accept the post 14 in the proper latching operation. The post 14 of the embodiment of FIG. 13 is mounted to the door 78 within a housing 50, together with the lock assembly 88. The lock assembly 88 is mounted in the manner described with respect to FIG. 1. The latching portion of the post 14 protrudes from the housing 50 with the mounting portion 13 of the post supported by self-aligning bearings 51 within the housing. The interface linkage 97 includes the shaft 98, which is rigidly attached to the core 90 of the lock assembly 88, and a collar 101, which is rigidly attached to (for example, formed as part of) the post 14. The pin 99 connects the shaft 98 to the post collar 101 to effect rotation of the post 14 upon turning of the lock assembly core 90, as by a key. The latching portion 15 of the post 14 is seen in this embodiment as being multi-surfaced, similar to those embodiments described with respect to FIG. 1. The latch portion 15 of this embodiment is shown without the "dead zone" 70 of FIG. 1, although such a feature is acceptable. Thus it is seen that the latching function of the embodiment of FIG. 13 is accomplished by arranging the locking assembly 88, prior to setting by the set screws 94, so that the arcuate surfaces 17 of the post are aligned with the balls 52 of the collar portion 12 when the lock assembly is in the lock position. When the door 78 is closed and the latch in effect, the latch is released by turning the lock assembly core 90, as by the key, to thus turn the post 14, until the inner surfaces 18 (of reduced radius "r") are aligned with the balls 52 of the collar portion 12. Thus, the angular-twist latch release is effected.

Figure 14:
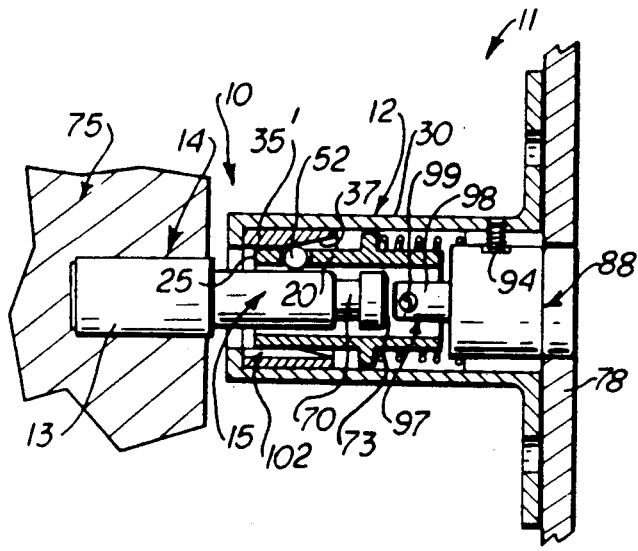
FIG. 14 is an isolated side view, with portions cut away, of a Door Latch, and related door components, in accordance with the present invention, and depicting a third alternate embodiment to that of FIG. 1.

Embodiment of FIG. 14

Figure 15:
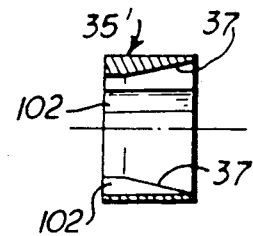
FIG. 15 is an isolated, cut away, side view of the tension ring of the Door Latch embodiment of FIG. 14.
Figure 16:
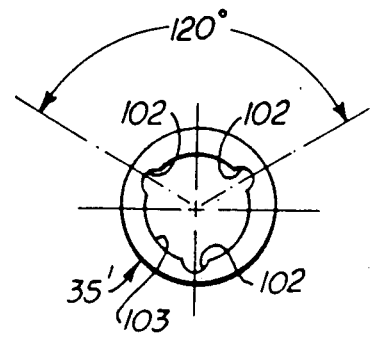
FIG. 16 is an isolated, back-end (right end of FIG. 15) view of the tension ring of FIG. 15.

Still another alternate embodiment of the door latch 11 of the present invention is seen in FIGS. 14-16. The embodiment of FIGS. 14-16 embodies a uniquely constructed post and collar mechanism 10 which allows for release of the latch by operation of the angular-twist release function, even though the latch portion 15 of the post 14 defines a completely cylindrical surface. The reader will recall that the angular-twist release function of the embodiments of FIGS. 1 and 13 operate by creating relative angular (rotational) movement between the post 14 and the inner shell 20 of the collar 12 so as to align the balls 52 with the reduced radius surfaces 18 of a multi-surfaced post. The embodiment of FIG. 14 effects operation of the angular-twist release function by aligning the balls 52 with grooves 102 formed in the tension ring 35'.

With reference to FIGS. 14–16, the major distinguishing features between this embodiment and the other discussed embodiments are detailed. The tension ring 35' is formed with grooves 102 extending axially along the inner surface 103 of the tension ring. (See FIGS. 15 and 16.) The collar portion 12 is assembled similarly to that of FIG. 1, with the inner shell 20 within the outer sleeve 30 and the balls 52 arranged for engagement with the cam surface 37 of the tension ring 35'. The latching portion 15 of the post 14 defines a completely cylindrical surface at the outer radius "R" which will effect the frictional gripping (latching) function of the post and collar combination, when the door 78 is closed and the balls 52 are not within the grooves 102 of the tension ring 35'. The grooves 102 are of sufficient depth such that, when the balls 52 are in the grooves, the frictional grip will not be effected among the post surface, the balls and the tension ring. Preferably, in this embodiment, the number of grooves 102 in the tension ring 35' corresponds to the number of ball 52 in the inner shell 20; and the angular displacement of the grooves about the inner surface 103 of the tension ring corresponds to the angular displacement of the balls.

The interface linkage 97 of embodiment of FIG. 14 is preferably similar to that of FIG. 1. Thus, the inner shell 20 is defined with the thin slot 26 in its front-end (refer to FIG. 4); an axially extending shaft 98 is mounted to the core 90 of the lock assembly 88 for rotation with the core; and a pin 99 is mounted to the shaft 98 interfacing with the slot 26. Thus, it is seen that the latching function of the embodiment of FIG. 14 is accomplished by arranging the locking assembly 88 within the cavity 41 (and with it the inner shell 20), prior to setting by the set screws 94, so that the balls 52 are not in the grooves 102 of the tension ring 35' when the lock assembly is in the lock position. When the door 78 is closed, and the latch in effect, the latch is released by turning the lock assembly core 90, as by the key, to thus turn the post 14, until the balls 52 are aligned with are aligned with the grooves 102.

Figure 17:
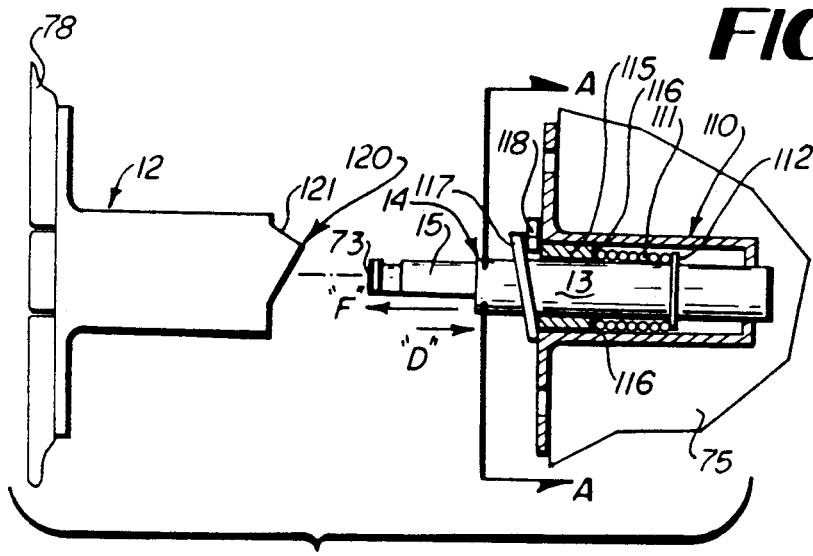
FIG. 17 is an isolated side view, with portions cut away, of a mounted post and related, cinching assembly in accordance with an alternate embodiment of the Door Latch of the present invention, showing the post in the blocked-extended position.

Embodiment of FIG. 17

Figure 17A:
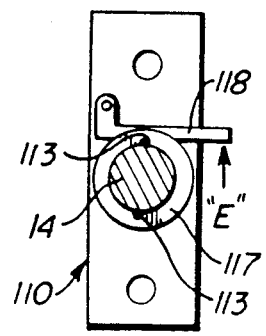
FIG. 17A is a view taken along line A—A of FIG. 18.
Figure 17B:
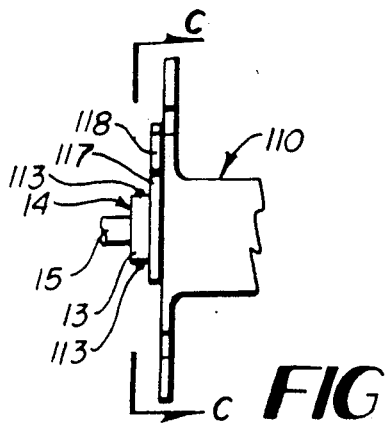
FIG. 17B is an isolated side view of the mounted post of FIG. 17, showing the post in the unblocked-retracted position.
Figure 17C:
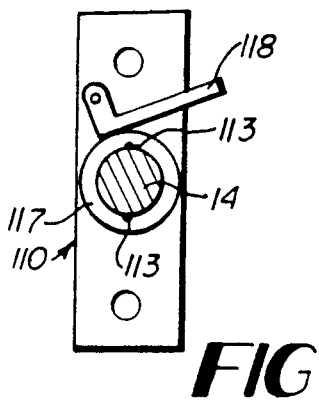
FIG. 17C is a view taken along line C—C of FIG. 17B.

Depicted in FIGS. 17—17C is an isolated view of components of yet another alternate embodiment of the door latch, in accordance with the present invention. The components shown in these FIGS. 17 are those constituting what shall be referred to as the "cinching post assembly". The cinching post assembly functions generally as a means for mechanically drawing the door 78 tightly to the door frame 78. In this embodiment, the post 14 is mounted within a housing 110. In this description, the post 14 and housing 110 will be described as mounted to the door frame 75 and the collar portion 12 mounted to the door 78; however, the opposite arrangement is acceptable. The post 14 is, preferably, spring loaded, as by the spring 111. The mounting portion 13 of the post 14 extends into and protrudes out of the housing 110; and it is guided on bearings 115 for movement axially within the housing. The bearings 115 are tightly press-fit into the housing 110 and create a retention plane 116. The post mounting portion 13 is keyed to prevent rotation within the housing 110. The mounting portion 13 of the post 14 is formed with a retention flange 112, such as a true-arc lock ring. The spring 111 of this disclosed embodiment encircles the post 14 and is "sandwiched" between the retention plane 116 and the retention flange 112. A simple washer 117 encircles the mounting portion 13 outside the housing 110. The washer 117 operates in association with a pivotable block 118 to alternately bind and release the post 14. That is, with the washer 117 blocked by the block 118 to create a tilt relative to the post 14, the post is prevented from moving in the direction of arrow "D" relative to the housing 110. (See FIGS. 17 and 17A.) When the block 118 is removed, as by pivoting, the washer 117 will move perpendicular to the post axis and the post 14 will move freely in the direction of arrow "D". (See FIGS. 17B and 17C.) Another component of the cinching post assembly is a lift mechanism 120 mounted to the door 78 of the vending machine or other cabinet. The lifting mechanism 120 includes an inclined surface 121 aligned to strike the outer end of the block 118 beyond the outer edge of the washer 117, such as at point "E" shown on FIG. 17A. As the door 78 moves closer to the frame 75, the pivotable block 118 moves up the inclined surface 121 until, eventually, the block is pivoted out from behind the washer 117. (See FIGS. 17B and 17C.) Dimples 113 are defined on the post mounting portion 13 to the outside of the washer 117 to prevent the washer from sliding off the end of the post.

In operation, the post 14 is "preloaded" by extending the post outward from the housing 110, in the direction of arrow "F" on FIG. 17, to compress the spring 111; and the washer 117 is blocked, by block 18, in the tilt position of FIG. 17. In the preferred embodiment, the extending of the post 14 is done manually by pulling or pushing the post; and may be assisted by a lever-like tool which engages the dead zone 70 and pries the post outward. The collar portion 12 and lifting mechanism are so oriented that the collar will latch to the latching portion 15 of the post 14 before the inclined surface 121 engages the block 118. Then, as the door 78 is manually pushed further closed, the lifting mechanism 120 moves the block 118 from behind the washer 117 and the spring 117 force takes over to retract the post 13 further into the housing 110, thus drawing the door 78 into close proximity to, preferably into a tight seal against, the door frame 75. Before closing the door 78 again, the post 14 is again preloaded.

Whereas the present invention has been described in detail herein, with specific reference to particular embodiments thereof, it will be understood that variations and modifications can be effected within the spirit and scope of the present invention, as described in this specification and as defined in the appended claims.

We claim:

1. Latching apparatus for releasably latching a first element to a second element, said apparatus comprising:
    a post member being supportable by a first element;
    a collar assembly being supportable by a second element and comprising
        an outer sleeve,
        an inner shell defining a cylindrical passage for receipt of said post member, said inner shell being connected to said outer sleeve and being movable in a first direction with respect to said outer sleeve in response to movement of said post member into said cylindrical passage in said first direction, and
        a detention means for effecting a grip on said post member when said post member is at least partially located within said passage; and
    releasing means for releasing said grip between said post member and said collar assembly.

2. Latching apparatus of claim 1, wherein said post member further comprises a first axially extending arcuate surface defined by a first radius from a central axis of said post member, and a second axially extending surface defined by at least one radius, each of said at least one radius being smaller than said first radius of said first surface.

3. Latching apparatus of claim 1, wherein said inner shell comprises at least one radial opening into said cylindrical passage, and wherein said detention means comprises at least one ball located at least partially within said at least one radial opening and a guiding means associated with said outer sleeve for guiding said at least one ball at least partially into said cylindrical passage.

4. Latching apparatus of claim 1, wherein said releasing means comprises a lock assembly means for selectively changing the relative positions of said post member and said inner shell with respect to one another, said relative positions defining, at least, a first arrangement and a second arrangement wherein said first arrangement encourages said grip and wherein said second arrangement discourages said grip.

5. Latching apparatus for releasably latching a first element to a second element, said apparatus comprising:
a post member being supportable by a first element and comprising a first axially extending surface and a recess, said recess including a recess wall;
a collar assembly being supportable by the second element and comprising
a cylindrical passage for receipt of said post member and
a detention means for impeding movement of said post member in at least one axial direction with respect to said collar assembly, said detention means being capable of impeding movement of said post member through interaction, in a first instance, with said first axially extending surface and through interaction, in a second instance, with said recess wall; and
a releasing means for selectively removing impedance created by said detention means.

6. Latching apparatus of claim 5 wherein said first axially extending surface is an arcuate surface defined by a first radius from a central axis of said post member, and wherein said post member further comprises a second axially extending surface defined by at least one radius, each of said at least one radius being smaller than said first radius.

7. Latching apparatus of claim 5 wherein said recess defines an annular peripheral recess.

8. Latching apparatus of claim 6 wherein said recess defines an annular peripheral recess.

9. Latching apparatus of claim 5 wherein said recess wall defines a plane parallel to a radial plane of said post member.

10. Latching apparatus of claim 5 wherein impedance created through interaction with said recess wall is greater than impedance created through interaction with said first axially extending surface.

11. Apparatus for releasably connecting a first object to a second object, said apparatus comprising:
a post member being supportable by a first object;
a collar assembly being supportable by a second object and comprising
an outer sleeve,
an inner shell defining a cylindrical passage for receipt of said post member, said inner shell being axially movable with respect to said outer sleeve, and
a detention means for effecting a grip on said post member when said post member is at least partially located within said passage;
means for supporting said post member to the first object; and
means for supporting said collar assembly to the second object.

12. Apparatus of claim 11, further comprising a releasing means for releasing said grip between said post member and said collar assembly.

13. Latching door apparatus comprising:
a first door element;
a second door element;
a post member supported by said first door element;
a collar assembly supported by said second door element, said collar assembly comprising, at least,
an outer sleeve,
an inner shell defining, at least, a cylindrical passage for receipt of said post member, said inner shell and said outer sleeve being so arranged as to allow relative axial movement with respect to one another; and
a detention means for impeding movement of said post member in at least one axial direction relative to said collar assembly when said post member is at least partially located within said cylindrical passage; and
a release means for selectively discouraging said impeding.

14. Door latching apparatus for releasably latching and locking one door element, such as a vending machine door, or the like, and another door element, such as a vending machine frame, or the like, said apparatus comprising:
a post member being supportable by a first door element, said post member comprising, at least,
a first axially extending, arcuate surface defining, in profile, a surface at a first radius from a central axis of said post member, and
a recess located in said arcuate surface; a collar assembly being supportable by a second door element, said collar assembly comprising, at least:
an outer sleeve,
an inner shell defining, at least, a cylindrical passage for receipt of said post member, said inner shell and said outer sleeve being so arranged as to allow relative axial movement with respect to one another, and
a detent means for, upon proper orientation, impeding movement of said post member in at least one axial direction relative to said collar assembly when said post member is at least partially located within said cylindrical passage,
a lock assembly means for selectively changing the relative positions of said post member and said inner shell with respect to one another, said relative positions defining, at least, a first arrangement and a second arrangement wherein said first arrangement encourages said impeding action of said detent means and wherein said second arrangement discourages said impeding action of said detent means.

15. Apparatus of claim 14, wherein said post member further comprises a second axially extending surface defining, in profile, a surface defined by at least one radius, each of said at least one radius being smaller than said first radius of said first surface, wherein said post member and said inner shell are so constructed as to allow relative angular movement between said post member and said inner shell when said post member is at least partially located within said cylindrical passage, and wherein said lock assembly means comprises means for changing the relative angular positions of said inner shell and said post member with respect to one another.

16. Apparatus of claim 14, wherein said first surface of said post member defines a surface representing, in profile, a smooth circle defined by a single radius, wherein said recess defines an annular, peripheral recess, and wherein said lock assembly means comprises means for changing the relative axial positions of said inner shell and said post member with respect to one another.

17. Apparatus of claim 14, wherein said first surface of said post member defines a surface representing, in profile, a smooth circle defined by a single radius, wherein said outer sleeve and said inner shell are so constructed as to allow relative angular movement with respect to one another, and wherein said outer sleeve includes, at least, an inner surface including a plurality of axially extending recesses.

18. Apparatus of claim 14, wherein said lock assembly means comprises at least,
- a key-operated locking linkage for securing said lock assembly means against changing of the relative positions of said post member and said inner shell with respect to one another,
- an axial shaft, and
- an interface linkage connected to said axial shaft, whereby said lock assembly means changes the relative positions of said inner shell and said post member with respect to one another through angular rotation of said axial shaft.

* * * * *